United States Patent
Choi

[19]

[11] Patent Number: 6,165,241
[45] Date of Patent: Dec. 26, 2000

[54] PLEATED FILTER MEDIA WITH STRIP SPACERS AND METHOD OF MAKING

[75] Inventor: Kyung-Ju Choi, Jefferson County, Ky.

[73] Assignee: AAF International, Inc., Louisville, Ky.

[21] Appl. No.: 09/277,794

[22] Filed: Mar. 27, 1999

[51] Int. Cl.[7] .................................................. B01D 29/21
[52] U.S. Cl. ............................ 55/521; 55/497; 55/499; 55/501; 55/DIG. 5; 210/493.5
[58] Field of Search ............................. 55/497, 498, 499, 55/500, 511, 514, 521, DIG. 5, 501; 210/493.5

[56] References Cited

U.S. PATENT DOCUMENTS

| | | |
|---|---|---|
| 4,177,050 | 12/1979 | Culbert et al. . |
| 4,268,290 | 5/1981 | Barrington . |
| 4,537,812 | 8/1985 | Elbers . |
| 4,707,167 | 11/1987 | Saito et al. ................................ 55/521 |
| 5,028,331 | 7/1991 | Lippold . |
| 5,064,598 | 11/1991 | Seiler . |
| 5,066,400 | 11/1991 | Rocklitz et al. . |
| 5,080,790 | 1/1992 | Widmann .................................. 55/521 |
| 5,290,447 | 3/1994 | Lippold .................................... 55/521 |
| 5,552,048 | 9/1996 | Miller et al. .............................. 55/521 |
| 5,744,036 | 4/1998 | Choi . |
| 5,871,836 | 2/1999 | Schultink et al. ........................ 55/521 |
| 5,888,262 | 3/1999 | Kahler ...................................... 55/521 |

*Primary Examiner*—David A. Simmons
*Assistant Examiner*—Minh-Chau T. Pham
*Attorney, Agent, or Firm*—Polster, Lieder, Woodruff & Lucchesi, L.C.

[57] ABSTRACT

A pleat filter arrangement and method of making the same wherein longitudinally extending sheets of filter media are pleated to include pliable strips adhesively extending between at least one face of the opposed pleat faces to separate the opposed pleat faces so as to allow fluid flow therethrough, the pleated filter media being cut to size as pleated filter medium units and framed.

24 Claims, 4 Drawing Sheets

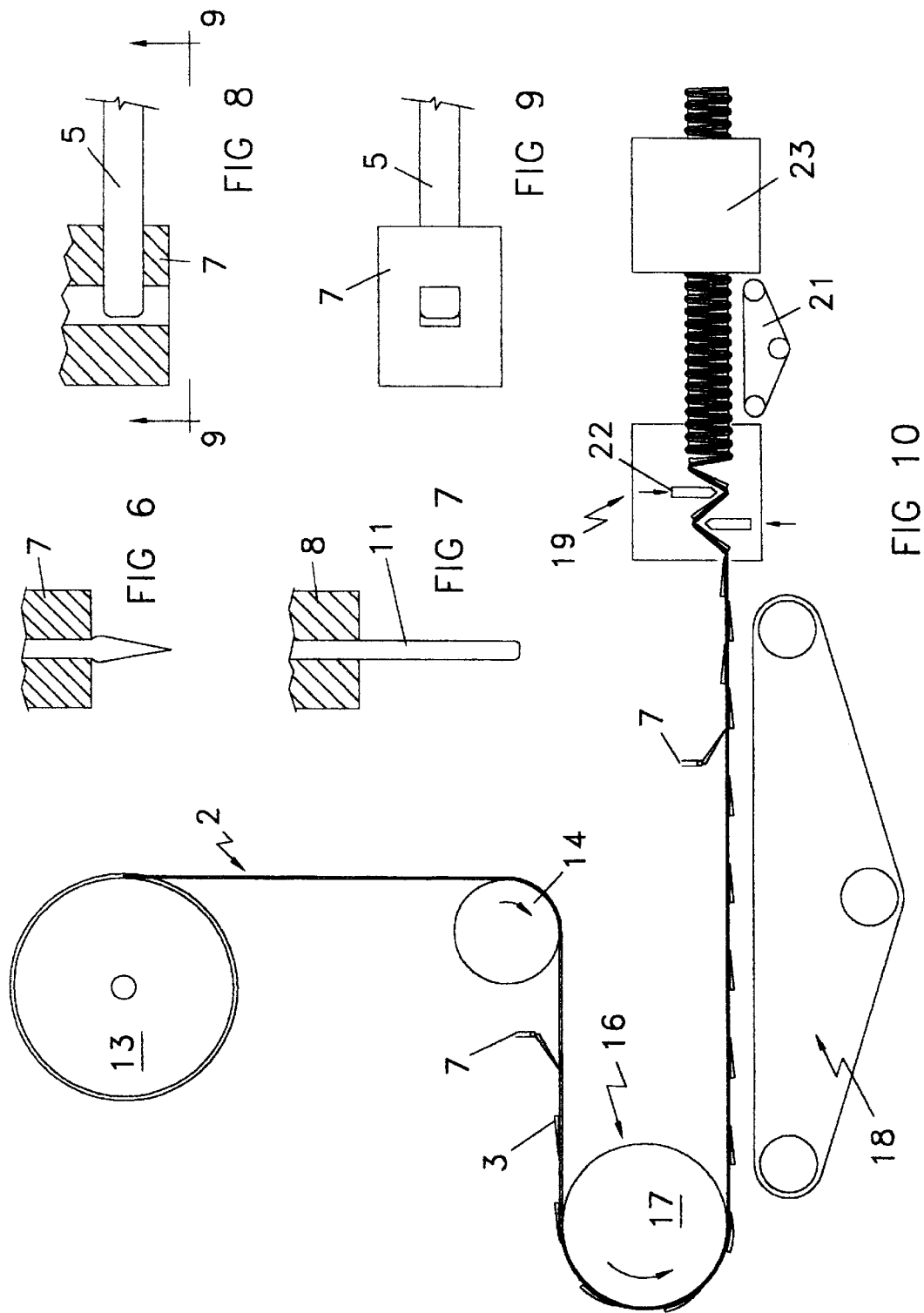

PLEATED FILTER MEDIA WITH STRIP SPACERS AND METHOD OF MAKING

BACKGROUND OF THE INVENTION

The present invention relates to a filter medium arrangement and method of making the same and more particularly, to a pleated filter medium which utilizes pliable adhesive spacer strips between opposed pleat faces to allow fluid flow therethrough, arresting particulate matter in a fluid stream as it passes through the pleated filter medium.

Pleated filter medium utilizing spacer arrangements between pleats of the medium for treating particulate bearing fluid streams to be passed therethrough are generally well known in the filter art. A number of issued patents which disclose pleat spacers formed from the filter medium, some of which spacers are of tapered contour, are noted herein and which are noted in applicant's co-filed and co-pending related U.S. application Ser. No. 9/277,795, filed on Mar. 27, 1999. In this regard, attention is directed to U.S. Pat. No. 4,268,290, issued to R. B. Barrington on May 19, 1981, U.S. Pat. No. 5,028,331, issued to H. Lippold on Jul. 2, 1991 (subsequent similar patents by this inventor not being listed herein); U.S. Pat. No. 5,064,598, issued to H. Seiler on Nov. 12, 1991; and, U.S. Pat. No. 5,066,40, issued to G. J. Rocklitz, et. al. On Nov. 19, 1991. Attention is further directed to a number of issued U.S. Patents, which disclose the use of external spacers between the filter medium, some of which spacers are also of tapered contour, such as U.S. Pat. No. 4,177,050, issued to R. M. Culbert et. al. On Dec. 4, 1979, U.S. Pat. No. 4,537,812, issued to R. W. Elbers on Aug. 27, 1985 and to U.S. Pat. No. 5,744,036, issued to K-J. Choi on Apr. 28, 1998—this patent teaching fluid flow through thermo-bondable screening. As noted in the co-pending U.S. Application, for the most part, the structures disclosed in the aforenoted patents have been comparatively complex and expensive in manufacture, and assembly, requiring numerous parts and assembly steps and adding comparatively high fluid resistance to the treated fluid stream.

The present invention provides a pleated filter medium arrangement, which is economical and straightforward in manufacture and assembly, requiring a minimum of parts and a minimum of method steps and, at the same time, providing a pleated filter medium which is comparatively stable and readily producible in various shapes and configurations to present an optimum amount of filter medium face to a fluid stream to be treated with a minimum amount of resistance.

Various other features of the present invention will become obvious to one skilled in the art upon reading the disclosure herein.

BRIEF SUMMARY OF THE INVENTION

More particularly, the present invention provides a pleated filter medium arrangement for removing particulate matter from a fluid stream comprising: at least one sheet of porous filter medium having opposed sheet faces, the filter medium sheet being pleated into a plurality of longitudinally extending spaced pleats of porous filter medium with adjacent pleats having opposed longitudinally extending uniplanar upstream and downstream pleat faces; at least one elongated pliable adhesive spacer extending in longitudinal nesting relation with and adhesively engaging between the opposed pleat faces along at least one of the opposed faces of the porous filter medium sheet to separate the opposed pleat faces to permit fluid flow of the fluid stream therethrough. In addition, the present invention provides a method of making pleat supported pleated filter units comprising: feeding a longitudinally extending continuous sheet of filter media, having opposed faces, from a filter media supply zone to a first spacer applicator zone; applying at preselected time periods pliable adhesive spacer material in the form of preselectively spaced strips extending in spaced rows adhesively and longitudinally along at least one of the faces of the longitudinal sheet of filter media in the first spacer applicator zone, said sheet moving at timed speeds in said first applicator zone; folding the continuous sheet of filter media preselectively after the spacer strips have been applied thereto in a filter media folding zone to fold the filter media into a continuous sheet of spaced pleats with the rows of spacer strips nesting between the pleats; and, passing the continuous sheet of pleated filter medium to a severing zone to cut the filter media to provide spaced pleat supported pleated filter medium units of preselected length.

It is to be understood that various changes can be made by one skilled in the art in one or more of the several parts and several steps of the novel apparatus and method described herein without departing from the scope or spirit of the invention. For example, the spacer strips and filter media can be made from one or more other materials or mixtures of materials with strips of varying geometric cross-sections and the media pleating can be accomplished with different machinery known in the art, if desirable.

BRIEF DESCRIPTION OF THE DRAWINGS

Referring to the drawings, which disclose several embodiments of the present invention:

FIG. 6 is a schematic view of one of a set of spaced pliable, adhesive material dispensers disclosing the inertial and die swell effect, which can be achieved with pliable fluid material dispensed therefrom, the effect being utilizable by pivotal movement of each such spaced dispenser when appropriately positioned above a sheet of filter media, for sufficient time periods to adhesively apply longitudinally extending tapered spacer segments thereon—as shown in FIGS. 1 and 2 above;

FIG. 7 is a schematic view of one of a set of spaced pliable material extruding dispensers, disclosing the substantially cylindrical effect, which can be achieved with pliable fluid material extrudingly dispensed therefrom, utilizable by direct, "in-line", dispensing therefrom when appropriately positioned above a sheet of movable filter media to adhesively apply by extrusion substantially cylindrical, longitudinally extending segments thereon—as shown in FIGS. 3–5 above;

FIG. 8 is an enlarged schematic cross-sectional side view of one of a set of spaced material dispensers, disclosing a schematic control member capable of varying the aperture and the amount of material dispensed therefrom;

FIG. 9 is a cross-sectional plan view of the schematic dispenser of FIG. 8;

FIG. 10 is a schematic side view representation disclosing alternative embodiments of novel apparatus which can be utilized to carry out the present novel invention; and, FIG. 11 is a plan view of the inventive filter media and spacer strip arrangement in accordance with FIG. 5 of the drawings.

DETAILED DESCRIPTION OF THE DRAWINGS

Figure 1:
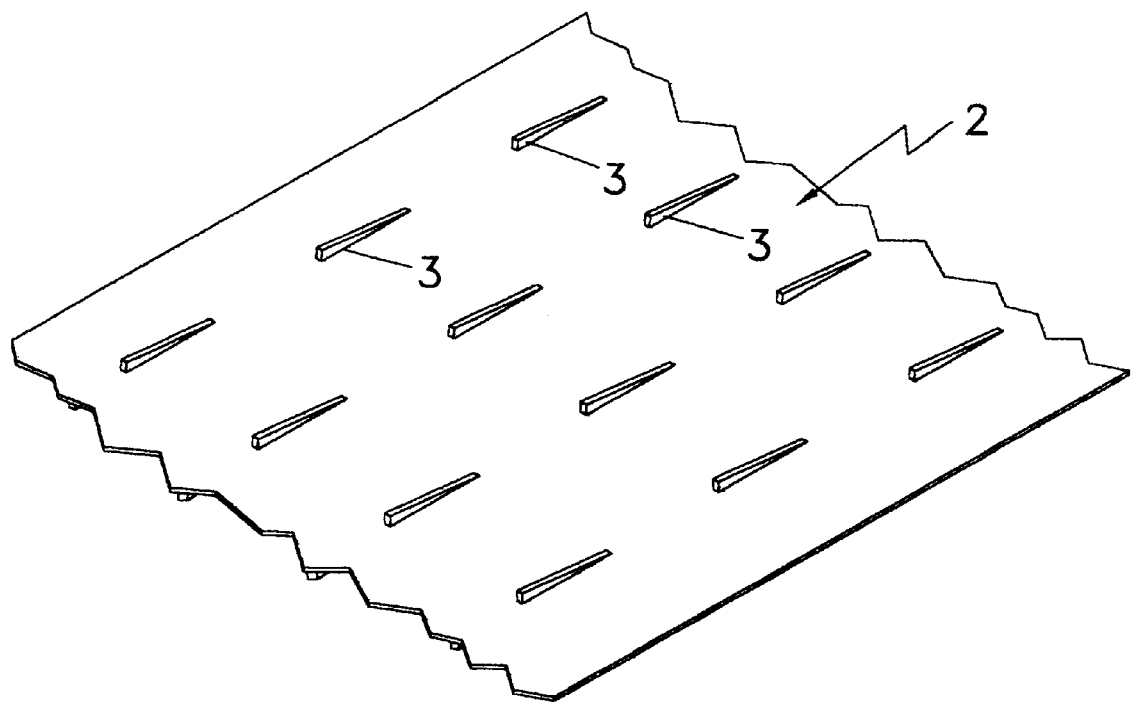
FIG. 1 is an enlarged isometric view of a portion of a flat sheet of filter media, the sheet having opposed longitudinally extending uniplanar faces with at least one face thereof having been substantially intermittently treated with somewhat exaggerated spaced rows of spaced pliable elongated adhesive spacer segments, prior to sheet pleating, the spacer segments each being tapered with varying cross-sections transverse the longitudinal axis of each spacer segment.
Figure 2:
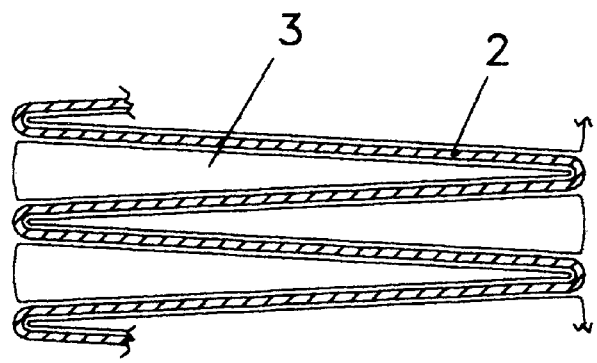
FIG. 2 is a side, cross-sectional view of a portion of the sheet of filter media of FIG. 1, illustrating the segmental pliable adhesive tapered spacer strips in nesting engagement between filter media pleats.

Referring to FIGS. 1 and 2 of the drawings, a portion of a sheet of filter media 2 is disclosed with spaced rows of spaced spacer strip segments 3 adhesively and thermally bonded thereto. The filter media 2 can be formed from any one of a number of known fibrous filter materials, such as spun or chopped glass fibers, a suitable synthetic polymeric material, or of natural fiber materials such as paper, with the porosity and sizes of the fibers adjusted in accordance with commercial needs and with the depth, width and breadth of the inventive pleated filter unit described hereinafter also being preselected in accordance with filtering needs. The longitudinally extending adhesive spacer strips 3 can be formed in a manner as also described hereinafter from any one of a number of known suitable fluid pliable adhesives and, advantageously, thermo-bondable plastic materials which advantageously can incorporate a small percentage by weight of calcium carbonate, clay, phosphate derivatives, or halogenic derivatives, so as to enhance flame retardency and to reduce the cost of polymeric material, as also described hereinafter. As can be seen in FIG. 2 of the drawings, the filter media sheet 2 is pleated along transversely extending lines between spaced rows of the pliable and adhesive spacer strip segments 3 so that adjacent pleats present opposed longitudinally extending uniplanar upstream and downstream pleat faces providing upstream and downstream crests and valleys. In accordance with the present invention and as can be more readily understood by referring to FIG. 10 of the drawings, at least two sets of spaced parallel pliable adhesive and thermo-bondable pleat spacer segment strips 3 can be provided, one set of spacer strips 3 being provided on one face of the filter media 2 and the other set of spaced spacer strip segments 3 being applied on the opposite face of filter media sheet 2.

Figure 3:
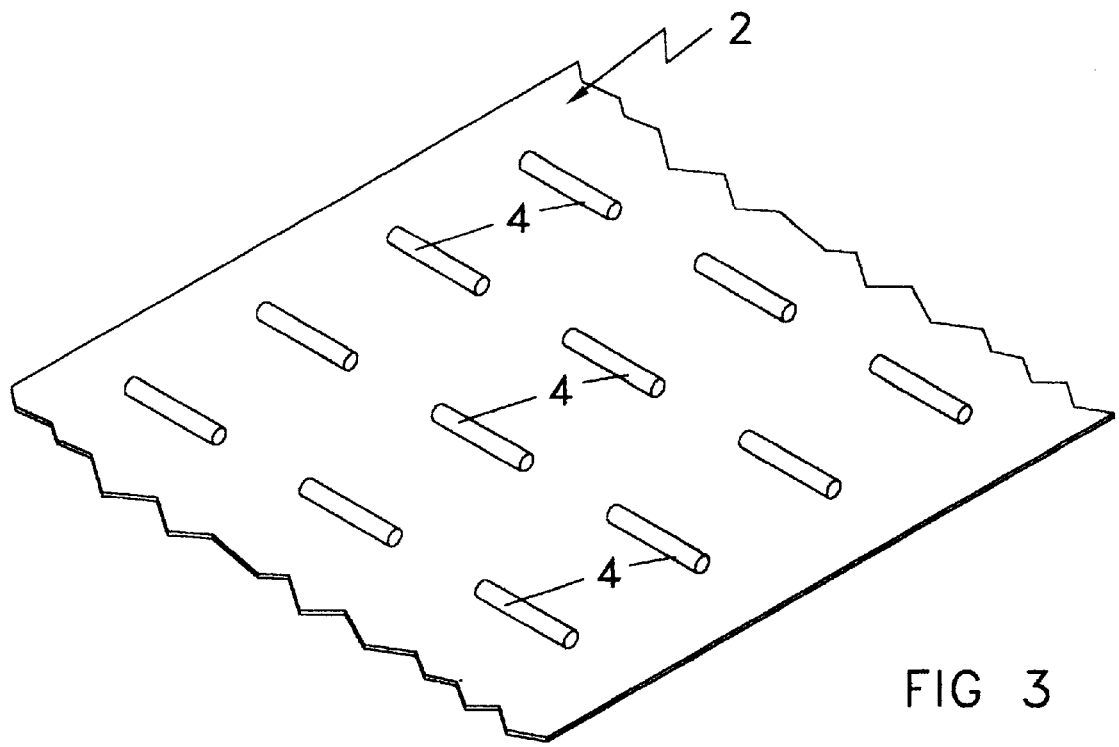
FIG. 3 is a view similar to the view of FIG. 1; the spacer strip segments each being of substantially similar cylindrical cross-section along the longitudinal axis of each spacer strip.
Figure 4:
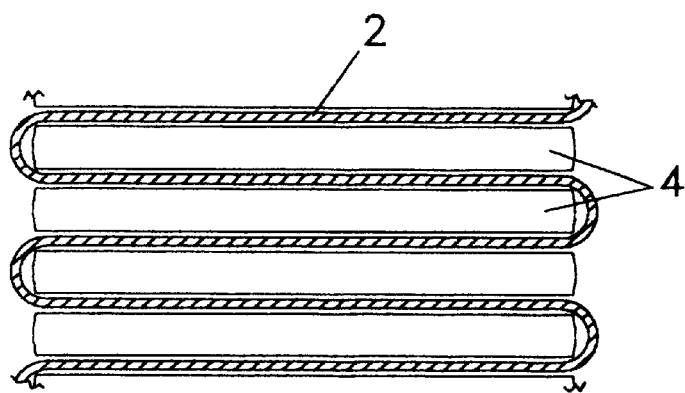
FIG. 4 is a side, cross-sectional view of a portion of the sheet of filter media of FIG. 3, illustrating the segmental, pliable, adhesive, substantially cylindrical spacer strips in nesting engagement between pleats.
Figure 5:
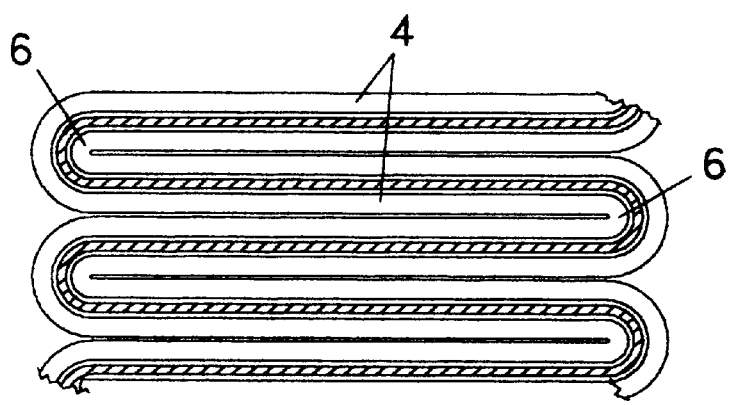
FIG. 5 is a side, cross-sectional view of a portion of a sheet of filter media similar to the filter media sheet of FIGS. 3 and 4, illustrating alternating spacer strips in the pleated sheet of filter media connected at extremities to form such alternating spacer strips as being longitudinally continuous.
Figure 11:
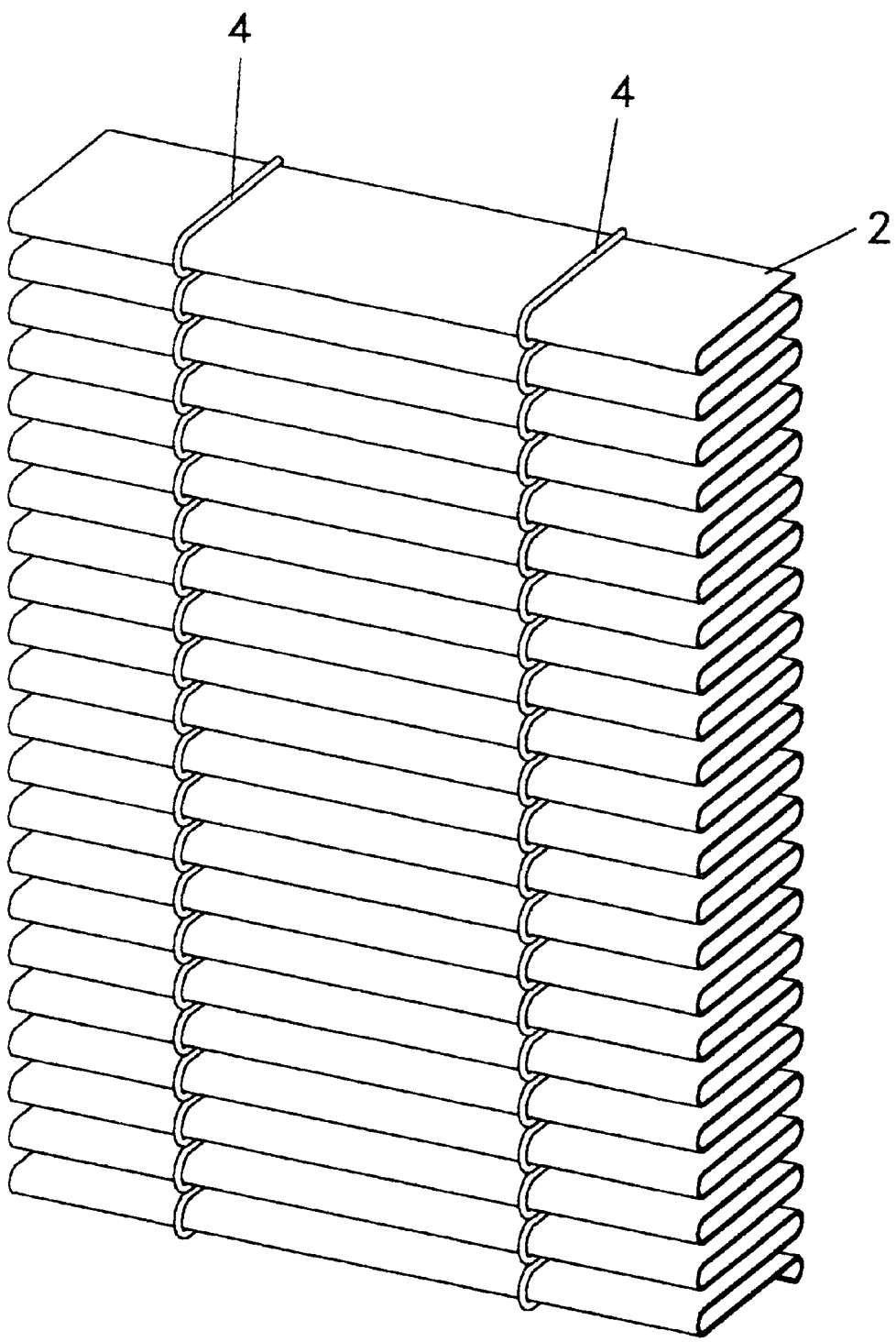

As can be seen in FIGS. 3 and 4 of the drawings, spacer strip segments 4 can be of circular cross-section throughout, dispensed on the filter media 2 in spaced configurations similar to the manner in which tapered spacer strip segments 3 are dispensed. In this regard, it is to be understood that the cross-sectional configurations of the spacer segments can be preselected to be of other geometric configurations as needs might demand—such as elliptical, triangular, or rectangular. Further, as can be seen in FIG. 5 of the drawings, alternate segment strips 4 can be joined by strip segments 6 to extend along opposed media crests and, in effect, forming continuous strips along opposed faces of the filter media.

Referring to FIGS. 6 and 7 of the drawings, another novel feature of the present invention is schematically illustrated by schematic dispensers 7 and 8 (of spaced rows of dispensers) disclosed respectively in FIGS. 6 and 7. In FIG. 6, dispenser 7 can be so shaped at the outlet and adjusted above a sheet of filter media 2 to a sufficient distance to emit or discharge a pleat segmental spacer strip 9 of suitable pliable fluid adhesive material so as to naturally take on a combination of an inertial and die swell effect. With the filter media moving in the filter media feeding process as described hereinafter, the pliable fluid material can be spread in spaced rows which include spaced spacer segments extending transversely across the filter media sheet from one longitudinal edge to the opposite longitudinal edge of the filter media sheet. The pliable fluid material can be dispensed in varying amount consistent with the inertial and die swell application effected by pivoted dispenser set 7 to thus create the desirable tapered spacer strips 3 (FIG. 2) with a minimum of effort and cost. In like manner, a dispenser 8 can be so shaped at the outlet, and adjusted above a sheet of filter media 2 a sufficient distance to emit or discharge a pleat segmental spacer strip 11 of cylindrical cross-sectional shape throughout which, when applied to filter medium sheet to extend transversely in spaced relation between opposed longitudinal edges of filter, media 2 becomes spacer segments 4 (FIGS. 4 and 5) also with a minimum of effort and cost. It is to be noted that tailings can occur between the spaced rows of spacers 3 (FIGS. 1 and 2) and spacers 4 (FIGS. 3–5) such tailings not effecting the filtering efficiency of the product and not being shown in the drawings. It further is to be noted that the quantity of pliable material emitted from dispensers 7 and 8 can be controlled by automatically operated valves 5 extending across openings 10 of dispensers 7 and 8. It also is to be understood that the relative movement between illustrated dispensers and filter media can be adjusted by adjusting movement of one or the other or both.

Thus, in accordance with the present invention, a novel unit pleated filter medium arrangement can be provided for removing particulate matter from a fluid stream which can include a filter medium formed from a sheet of filter media 2 which can be of a fire retardant glass fiber sheet of spun or chopped glass, natural fiber material, a synthetic fibrous material such as polyester or polypropylene material, or a preselected combination of certain of the aforesaid materials. The filter media sheet is pleated into a plurality of longitudinally extending spaced pleats of porous filter media with adjacent pleats presenting opposed upstream and downstream pleat faces providing upstream and downstream crests and valleys. At least two spaced, parallel, bondable, tapered pleat segments 3, or cylindrical segments 4, can serve to nest with the pleats along the upstream and downstream sides thereof. The segment strips 3 and 4 can be formed from major portions by weight of polymeric material mixed with minor portions by weight of calcium carbonate, clay, phosphate derivatives, or halogenic derivatives to enhance flame retardency qualities with one spaced parallel set of strip segments extending in tapered fashion from upstream crests to upstream valleys substantially normal to the longitudinal lines defined by the upstream crests and valleys and adhesively bonded to at least one upstream face of the pleats and with the other spaced, parallel set of strip segments extending from downstream crests to downstream valleys of the pleats substantially normal to the longitudinal lines defined by the downstream crests and valleys and also bonded to at least one downstream face of the pleats. The sets of spacer strip segments advantageously can decrease in cross-sectional area between corresponding crests and valleys to provide tapered strips. The pleated filter medium unit can be provided with any one of several known peripheral frame members, which also can be of a material with selected flame retardant characteristics.

Unique and novel methods for manufacturing the above-described novel pleated filters is schematically disclosed in FIG. 10 of the drawings. In the inventive methods of making pleat supported filter units, a suitable fibrous media sheet 2 is fed in a vertically downward fashion from a supply zone 12 where it is supported in roll form 13 past an idler roll 14 where it is turned horizontally with one face thereof positioned to receive one or more of the types of spaced tapered spacer strips 3, such as described above from a row of spaced pivotal dispensers 7, disposed in a first spacer applicator zone. The quantities of pliable fluid adhesives dispensed from the row of spaced dispensers 7 can be controlled automatically by slidable valves 5 extending across the fluid passage 10 of each dispenser 7 and the emitted pliable fluid adhesive forming strips 3 takes on the aforesaid combination of an inertial and die swell effect when emitted from each dispenser 7. Spaced tapered strips 3 of fluid synthetic adhesive material are applied transversely as spaced rows of spaced segments across one face of the filter media sheet 2 so that each row of spaced strip segments extends from one longitudinal edge of filter media sheet 2 to the opposite longitudinal edge of the sheet. Each tapered strip 3, as aforedescribed, is applied in viscous fluid state and in combined inertial and die swell fashion (FIG. 6) by a row of spaced dispensers 7 with movement of dispensers 7 being coordinated with movement of filter media sheet 2, so that controlled amounts of adhesive material for each strip are increasingly dispensed from one longitudinal edge of filter media 2 to the opposite longitudinal edge so as to provide the spaced, tapered strips 3. It is to be understood that the relative travel of filter media sheet 2, movement of the dispensers 7, and quantities dispensed can be controlled to allow an appropriate application of material along spaced row intervals. For example, it would be possible to move a row of spaced dispensers 7 synchronously with the filter medium sheet 2 movement to provide the spaced parallel rows of spaced strips 3 on sheet 2. With tapered strips 3 appropriately applied to filter media sheet 2, sheet 2 can then be passed to a manipulating zone 16 where it is turned on an idler roll 17 to present the opposite face of the sheet of filter media 2 to be fed to a row of second dispensers 7, similar to the row of first dispensers. Spaced, tapered pleat strips 3 can then be applied in the same manner as applied to the opposite face of filter media sheet 2 with the strip segment rows on one face of filter media sheet 2 being intermediately offset from the rows of tapered strip segments 3 on the opposed face of the filter media sheet 2. The filter media sheet 2 with the spaced and offset sets of tapered spacer rows on opposed faces can then be passed on conveyor 18, to a folding zone 19, unto a conveyor 21. In FIG. 10, two alternative embodiments of folding are disclosed. In one embodiment, conveyor 21 can be arranged to move at a slower speed than conveyor 18 and, as a consequence, the continuous sheet of filter media 2 with tapered spacers strips 3 applied on opposed faces is folded into pleats with the rows of tapered spacers 3 nesting between opposed pleat faces. In the other folding embodiment of the invention, it is to be noted that opposed, mechanically moved and timed pleating arms 22, schematically shown in folding zone 19 with opposed arrows 22, can also be utilized to fold or assist in the folding of the filter media sheet 2. After folding into pleats, the pleated filter media sheet 2 with the nesting rows of segmental strips 3 can then be passed to a severing and framing zone 23, where the pleated filter media sheet 2 is cut at preselected intervals and framed into pleated filter medium units of preselected length, breadth and pleat depth.

The invention claimed is:

1. A pleated filter medium arrangement for removing particulate matter from a fluid stream comprising: at least one sheet of porous filter medium having opposed sheet faces, said filter medium sheet being pleated into a plurality of longitudinally extending spaced pleats of porous filter medium with adjacent pleats having opposed longitudinally extending uniplanar upstream and downstream pleat faces; at least one elongated pliable adhesive spacer strip extending in longitudinal nesting relation with and adhesively engaging between said opposed pleat faces along at least one of the opposed faces of said porous filter medium sheet to separate said opposed pleat faces to permit fluid flow of said fluid stream therethrough.

2. The pleated filter arrangement of claim 1, said pliable adhesive spacer strip being a bondable synthetic material.

3. The pleated filter media arrangement of claim 1, both sheet faces of said porous filter medium sheet having at least one pliable adhesive strip extending in nesting relation with and engaging between said opposed pleat faces along both of said opposed faces of said porous filter medium sheet.

4. The pleated filter medium arrangement of claim 1, wherein said pliable adhesive strip extends continuously between substantially all of said longitudinally extending spaced pleats of said filter medium sheet.

5. The pleated filter medium arrangement of claim 1, wherein said pliable adhesive strip comprises: separate individual strip segments with at least one strip segment between each of said opposed pleat faces of said adjacent pleats.

6. The pleated filter medium arrangement of claim 1, said pliable adhesive strip being bonded to at least one pleat face of adjacent pleat faces of said filter medium.

7. The pleated filter arrangement of claim 1, said pliable adhesive strip being bonded to both opposed faces of adjacent pleat faces of said filter medium.

8. The pleated filter arrangement of claim 1, said pliable adhesive strip having a substantially similar circular cross-section throughout.

9. The pleated filter arrangement of claim 1, said pliable adhesive strip having a substantially similar cross-section throughout of geometric configuration.

10. The pleated filter arrangement of claim 1, said pliable adhesive elongated strip having a cross-sectional area, which varies in cross-sectional area from one extremity thereof to the other to provide a tapered strip spacer segment.

11. The pleated filter medium arrangement of claim 1, wherein a row of at least two spaced pliable adhesive strip segments extend in nesting relation with and engage between said opposed pleat faces along at least one of the opposed faces of said filter medium sheet.

12. The pleated filter medium arrangement of claim 1, wherein said arrangement is of flame retardant added materials.

13. The pleated filter media arrangement of claim 1, wherein said pliable adhesive strip includes an amount by weight of calcium carbonate.

14. The pleated filter media arrangement of claim 1, wherein said pliable adhesive strip includes an amount by weight of clay.

15. The pleated filter media arrangement of claim 1, wherein said pliable adhesive strip includes an amount by weight of phosphate derivatives.

16. The pleated filter media arrangement of claim 1, wherein said pliable adhesive strip includes an amount by weight of halogenate derivatives.

17. The pleated filter medium arrangement of claim 1, said porous filter medium being composed of glass fiber.

18. The pleated filter medium arrangement of claim 1, said porous medium being of synthetic material.

19. The pleated filter medium arrangement of claim 1, said porous medium being a combination of glass fiber and synthetic material.

20. The pleated filter medium arrangement of claim 1, said porous medium being of natural fiber material.

21. The pleated filter medium arrangement of claim 1, said pliable adhesive strip being of polymeric material.

22. The pleated filter medium arrangement of claim 1, said pliable adhesive strip being a polyvinyl acetate and polyolefin blend.

23. The pleated filter medium arrangement of claim 1, and a flow-through support frame for said arrangement.

24. A pleated filter medium arrangement for removing particulate matter from a fluid stream comprising: a sheet of porous filter medium having opposed sheet faces, said filter medium sheet being pleated into a plurality of longitudinally extending spacer pleats of porous filter medium with adjacent pleats presenting opposed longitudinally extending uniplanar upstream and downstream pleat faces providing upstream and downstream crests and valleys; at least two spaced row sets of spaced parallel adhesively bondable pleat strip spacer strip segments, the major portion by weight of which segments are formed of polymeric material and a minor portion by weight of which are formed of flame retardant qualities with one spaced parallel row set of strip segments extending from upstream crests along upstream valleys of said pleats substantially normal to and between the longitudinal lines defined by said upstream crests and valleys and bonded to at least one upstream face of said pleats and with the other spaced, parallel row set of strip segments extending from downstream crests to downstream valleys of said pleats substantially normal to and between the longitudinal lines defined by said downstream crests and valleys and bonded to at least one downstream face of said pleats, said sets of bondable spacer strip segments being of geometric cross-section, decreasing in cross-sectional area from crest to valley, to provide tapered spacers strips; and a peripheral frame member for said pleated, bonded sheet of filter medium.

* * * * *